United States Patent
Antosh

[11] Patent Number: 5,910,004
[45] Date of Patent: Jun. 8, 1999

[54] VIBRATION ENHANCER FOR FISHING ROD

[76] Inventor: Mark A. Antosh, 4822 Blue Ridge Trail, Mountaintop, Pa. 18707

[21] Appl. No.: 08/933,265

[22] Filed: Sep. 18, 1997

[51] Int. Cl.$^6$ ............................. A01K 97/10; A01K 87/00
[52] U.S. Cl. ............................... 43/21.2; 43/25; 224/222; 224/251; 224/267; 224/922
[58] Field of Search .................. 43/17, 21.2, 25; 248/541, 540, 538, 534, 231.81, 230.1; 224/222, 251, 267, 922

[56] References Cited

U.S. PATENT DOCUMENTS

| | | |
|---|---|---|
| 774,143 | 11/1904 | Adams . |
| 1,632,726 | 6/1927 | Conklin . |
| 1,761,497 | 6/1930 | Smith . |
| 1,786,254 | 12/1930 | Meehan . |
| 2,212,212 | 8/1940 | Planitz ....................................... 224/5 |
| 2,244,408 | 6/1941 | Thompson ................................. 43/25 |
| 2,271,136 | 1/1942 | Geiger ........................................ 224/5 |
| 3,367,056 | 2/1968 | Johnson ..................................... 43/25 |
| 4,871,141 | 10/1989 | Chen ........................................ 248/534 |
| 5,159,775 | 11/1992 | Sutula, Jr. ................................ 43/21.2 |
| 5,212,900 | 5/1993 | Perry ........................................ 43/21.2 |
| 5,237,769 | 8/1993 | Navarro ................................... 43/21.2 |

*Primary Examiner*—Jack W. Lavinder
*Attorney, Agent, or Firm*—Anthony J. Dixon

[57] ABSTRACT

A device for enhancing the effectiveness of a fisherman by translating line vibration to the fisherman wherein a rod holder which has an arm member which transverses the forearm of the user utilizing a semicircular portion and a strap portion and a circular receptacle of split-ring configuration into which the handle or butt end of a fishing rod is inserted. The receptacle has a decreasing inner diameter with inwardly protruding ribs to enhance the fit of the rod handle and accommodate various sizes. The user holds the rod at a location on the handle closer to the tip than the receptacle and this provides a fulcrum at the hand location which allows tip vibration to be translated more effectively to the forearm of the user to increase the user's sensitivity or feel of the action on a lure or bait by the action of a fish or the bottom of the body of water being fished.

3 Claims, 2 Drawing Sheets

VIBRATION ENHANCER FOR FISHING ROD

FIELD OF THE INVENTION

The present invention relates to the field of fishing generally and more particularly to the field of devices for enchancing the effectiveness of the fisherman by improving the translation of vibration of the line through the rod to the fisherman. More particularly it relates to a device which holds a fishing rod in a manner to increase the fisherman's awareness of rod vibration either through a bite or strike by a fish or the action of the baited end of the line with the bottom of the body of water being fished.

Related Matters

The present invention was disclosed in Document Disclosure 408,929, filed Nov. 22, 1996.

BACKGROUND OF THE INVENTION

Over the years the field of fishing has seen a multitude of products to enchance the effectiveness of the fisherman. These include improvements in fishing rods from the split-bamboo of old to the present graphite designs. Various handle materials from cork to foam have also been used. Improvements in rod ferrules have increased the effectiveness of casting and line flow and improvements in fishing lines have greatly enchanced the user's ability to present baits and lures effectively. Many of these products have attempted to increase the ability of the fisherman to sense or feel the action of an underwater bait or lure which cannot be seen by the user during its use.

The ability to sense or feel a strike or bite by the fisherman and to differentiate it from a snag or bump on the bottom surface is a skill heretofore enchanced only by practice and patience, that is by improving the technique of the user.

Although the improvements from the cane pole of Huck Finn to the present graphite rod marvels have aided in that ability, a device for improving feel or touch has long been desired in the art.

The problem is made ever worse if the present type of rod holders are used since the configuration of such rod holders will reduce the ability of the user to sense or feel the vibration translated from bait or lure, through the line, to the rod and eventually to the user.

These problems and shortfalls are addressed and solved by the present invention which provides a rod holder which enchances the feel or sense of the user thereby increasing his fishing effectiveness while decreasing fishing fatigue caused by prolonged holding of a fishing rod.

It is therefore an object of the present invention to provide a device which enchances the effectiveness of a fisherman.

It is a further object of the present invention to provide a device which aids in the holding of a fishing rod while transmitting vibration caused by a strike or bite to the user in an enhanced fashion.

It is a further object of the present invention to provide a device which allows the fisherman-user to sense or feel the condition of the bottom surface by improving the translation of the vibration at the lure bumping or striking the bottom.

It is a further object of the invention to provide a device which can hold rods of various handle configurations and dimensions.

It is a further object of the present invention to provide a device which enables the user to detect vibrations in the fishing line which might otherwise go completely undetected.

It is a further object of the present invention to provide a device which allows the fisherman to sense or feel light bites of bait or lure by a fish and to differentiate them from bumps or snags of the lure or bait from the bottom.

These and other objects and advantages are achieved by the present invention, a summary of which follows.

SUMMARY OF THE INVENTION

The present invention provides a rod holder which enchances the feel of vibration by the user which comprises an arm member which is attached transversely to the forearm of the user, and is of generally semicircular configuration, a stem protruding outwardly from the arm member attached to a circular receptacle accommodatingly larger than the butt end of a fishing rod. The receptacle has an interior diameter which decreases along the width to allow for snug fit of a rod handle by insertion until the inner diameter engages the rod handle. A series of inwardly protruding circumferentially ribs are provided on the inner diameter of the receptacle to enhance the sliding connection of rod handle to receptacle.

The arm member is attached to the arm by an adjustable strap so that it can be used on a variety of sizes of forearms and the receptacle is of a split-ring configuration to allow it to open as the rod handle is inserted and enhance the connection due to its tendency to return to its original shape.

After a cast is made, the user wearing the device on the forearm, inserts the butt end of the handle into the receptacle and lightly holds the handle with his hand, the rod-hand connection acting as a fulcrum between the rod tip and butt end.

When vibration of the line causes the tip of the rod to move, the butt end, by lever action over the fulcrum of the user's hand, wil enchance and translate the slightest movement to the user's forearm. In use, the fisherman will be able to detect the difference between a strike and a snag and will be able to detect the differences in bottom condition from soft to hard, muddy to rocky, by the vibrations which would otherwise not be felt. Simultaneously, the user is provided with a rod holder which relieves fatigue caused by holding the rod. When a strike is made and a fish is hooked, the rod is easily removed for the purpose of landing the fish in normal style.

The construction, use and advantages of the above summarized invention will be more readily understood and appreciated when the following detailed description and detailed drawings are read in conjunction with each other.

DESCRIPTION OF THE PREFERRED EMBODIMENT

Figure 1:
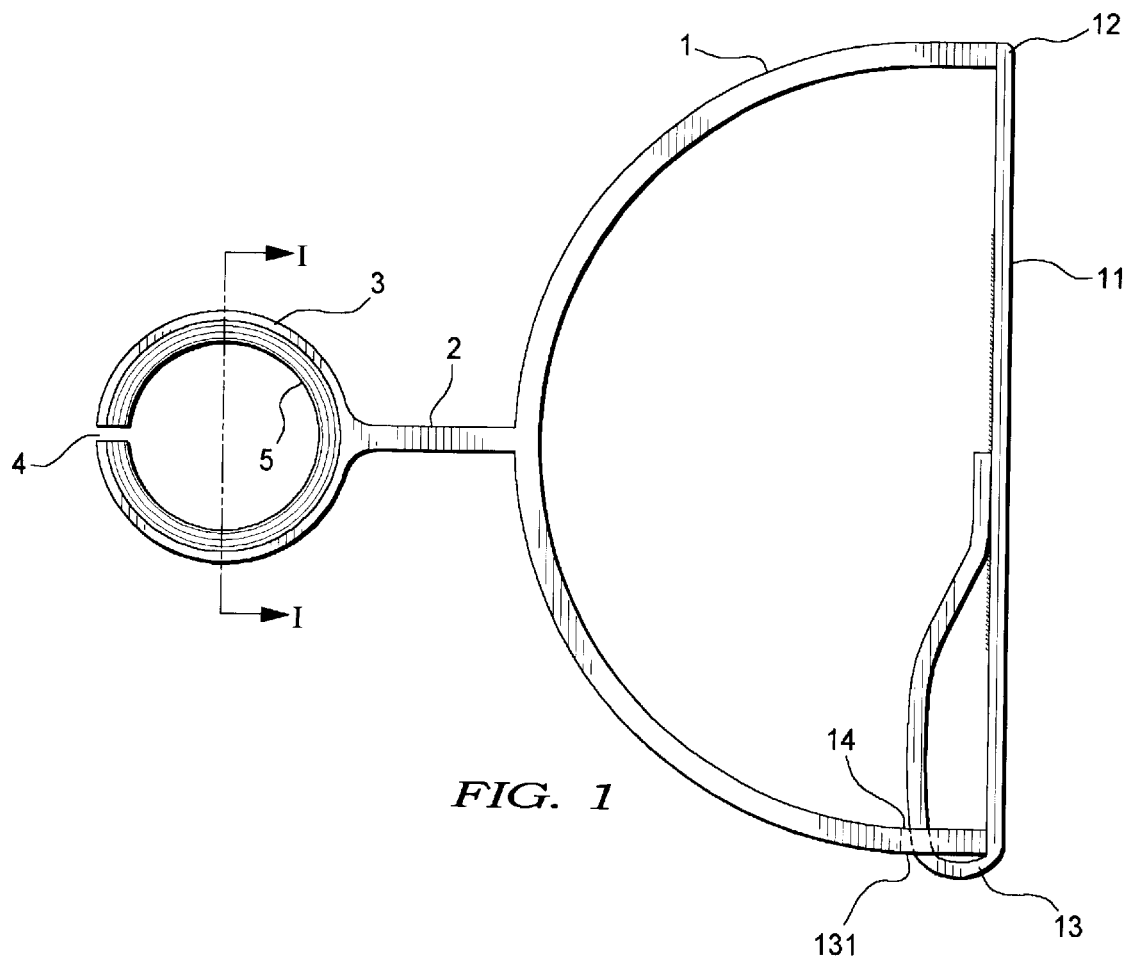
FIG. 1 is a top view of the present invention.
Figure 2:
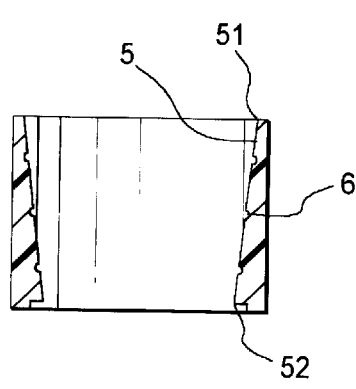
FIG. 2 is a side view of the interior face of the receptacle along lines I—I of FIG. 1.
Figure 3:
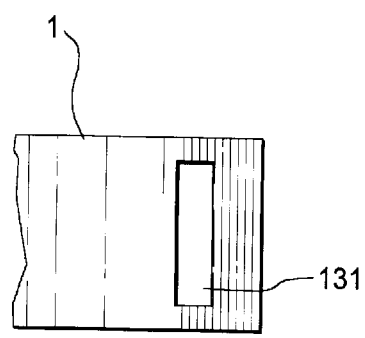
FIG. 3 is a side view of the buckle connection of the arm member of FIG. 1.

Referring initially to FIG. 1, a top view of the device of the present invention can been seen. Arm member, 1, of semicircular configuration is designed to span the forearm of the user. Connected thereto is strap, 11, which is fixed on one end, 12, to member, 1, and on the other end, 13, is attached to buckle means, 131. In the preferred embodiment, strap, 11, passed through a slot, 14, and is drawn back over itself and connected to complete the loop of closure transversing the forearm. A loop-pile connector with one end in the strap end and another midway on the strap body, will provide an adjustable length strap to accommodate a wide range of forearm girths. Such a connection is depicted on strap, 11, in FIG. 1.

A stem, 2, protrudes from the arm member, 1, as shown and connects to a receptacle, 3, which is of a split-ring configuration with a split, 4, defined in its body to allow the receptacle, 3, to spread open to receive the fishing rod but, through the elasticity of the body of receptacle, 3, to resist opening, thereby causing a firm hold through tension at the rod butt or handle.

The interior of receptacle, 3, has an interior diameter, 5, which decreases in diameter from the front edge, 51, to the rear edge, 52, to provide a means to accommodate various handle sizes in a firm manner and to facilitate rod removal.

A series of ribs or grooves, 6, are defined circumferentially around the inner face, 5, of receptacle 3, to enhance and improve this connection.

Figure 4:
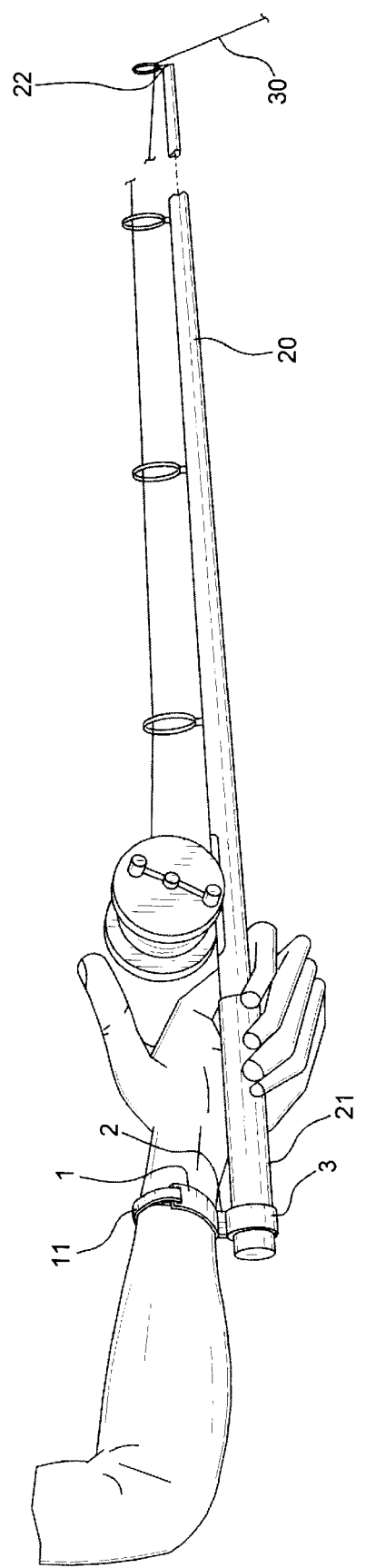
FIG. 4 is showing the device attached to the arm of the user.

The device, with a rod inserted, is shown in FIG. 4, where the rod, 20, with tip, 22, and butt end, 21, is inserted into receptacle, 3.

When a strike or other vibration is occasioned on the end of line, 30, it is translated to the rod, 20, which will vibrate. The hand of the user shown in FIG. 4 will act as a fulcrum between rod tip, 22, and rod butt, 21. Butt, 21, will, through its connection to the forearm with the present device, translate this motion, and the motion, to the forearm of the user.

In this way, the user will feel or sense the slightest vibration caused by the lure or bait on the end of line, 30, as it is contacted by a fish, the bottom or a snag. The user will quickly be able to differentiate these feelings through the enhanced translation of this vibration to the user's forearm thereby increasing fishing effectiveness and accomplishing the objects of the present invention.

The preferred diameter of the arm member is about four inches (4") and the stem length is preferred to be about one inch (1"). The receptacle has an interior diameter which tapers from about one and one-quarter inches (1¼") to one inch (1") to accommodate most standard rod handles. The material of construction is preferred to be a pliable plastic; however, other pliable materials to allow for the split-ring action of the receptacle are also envisioned.

It should be understood by these with skill in the art that obvious receptacles and selections of materials can be made without departing from the spirt and scope of the present invention. Accordingly, reference to the following claims to determine the scope of the invention should be made.

I claim:

1. A device for improving the sensing of vibration of a fishing rod by the user comprising an arm member of semi circular configuration which transverses a forearm of the user; a strap portion attached to the arm member to attach the arm member to the forearm of the user; a stem, protruding from the arm member; a pliable receptacle comprising a tubular body attached to the stem, said tubular body having the side of a split defined in the body to allow the receptacle to increase in diameter in response to a fishing rod handle being inserted therein, an inner surface having an interior diameter which gradually decrease in size from one end to an opposite end of the tubular body and a series of ribs defined in said inner surface of said body, whereby a fishing rod handle is inserted into the receptacle and vibrations of the rod caused by interaction of a fishing line are translated to the forearm of the user.

2. The device of claim 1 wherein the arm, stem and receptacle are constructed of pliable plastic.

3. The device of claim 2 wherein the strap is fastened with loop-pile connector.

\* \* \* \* \*